(12) United States Patent
Hasegawa et al.

(10) Patent No.: US 11,494,338 B2
(45) Date of Patent: Nov. 8, 2022

(54) CACHING FILES IN A DIRECTORY

(71) Applicant: International Business Machines Corporation, Armonk, NY (US)

(72) Inventors: Tohru Hasegawa, Tokyo (JP); Hiroshi Itagaki, Yokohama (JP); Tsuyoshi Miyamura, Yokohama (JP); Noriko Yamamoto, Tokyo (JP); Shinsuke Mitsuma, Machida (JP)

(73) Assignee: International Business Machines Corporation, Armonk, NY (US)

(*) Notice: Subject to any disclaimer, the term of this patent is extended or adjusted under 35 U.S.C. 154(b) by 551 days.

(21) Appl. No.: 16/395,930

(22) Filed: Apr. 26, 2019

(65) Prior Publication Data
US 2020/0341946 A1    Oct. 29, 2020

(51) Int. Cl.
*G06F 16/172* (2019.01)
*G06F 16/13* (2019.01)

(52) U.S. Cl.
CPC ............ *G06F 16/172* (2019.01); *G06F 16/13* (2019.01)

(58) Field of Classification Search
CPC ............................... G06F 16/172; G06F 16/13
USPC .......................................................... 707/823
See application file for complete search history.

(56) References Cited

U.S. PATENT DOCUMENTS

| 4,638,424 A * | 1/1987 | Beglin ..................... G06F 12/08 711/112 |
| 5,384,673 A * | 1/1995 | Yoshioka ............... G06F 3/0601 |
| 5,506,986 A * | 4/1996 | Healy .................... G06F 3/0601 711/111 |
| 6,202,135 B1 * | 3/2001 | Kedem ............... G06F 11/1458 711/162 |
| 8,817,411 B1 * | 8/2014 | Sims ....................... G06F 3/065 711/111 |
| 9,502,052 B1 * | 11/2016 | Hasegawa .............. G11B 20/10 |
| 2004/0098547 A1 * | 5/2004 | Ofek .................... G06F 11/1451 711/170 |
| 2004/0165304 A1 * | 8/2004 | Greco ................ G11B 20/1201 360/75 |
| 2005/0256999 A1 * | 11/2005 | Kishi .................... G06F 3/0664 711/111 |

(Continued)

OTHER PUBLICATIONS

List of IBM Patents or Patent Applications Treated as Related, Apr. 18, 2019, 2 pgs.

(Continued)

*Primary Examiner* — James Trujillo
*Assistant Examiner* — Fariborz Khoshnoodi
(74) *Attorney, Agent, or Firm* — Robert J. Shatto

(57) ABSTRACT

Provided is a method, computer program product, and system for enumerating files on a tape medium and a cache storage device. The method includes receiving a command to enumerate a directory stored on a tape medium. The directory includes a plurality of files. The method further includes determining that the directory has been at least partially cached to a cache storage device. The method further includes determining, for each file of the directory that is stored in the cache storage device, whether the file has been enumerated. In response to determining that the file has not been enumerated, the method includes returning information of the file as a response to the command. The method further includes mounting the tape medium in parallel to retrieving data from the cache storage device.

17 Claims, 15 Drawing Sheets

(56) References Cited

U.S. PATENT DOCUMENTS

| | | | |
|---|---|---|---|
| 2010/0057790 A1* | 3/2010 | Johnson | G06F 3/0629 |
| | | | 707/E17.007 |
| 2011/0047437 A1 | 2/2011 | Flynn | |
| 2011/0066808 A1 | 3/2011 | Flynn et al. | |
| 2012/0030179 A1* | 2/2012 | Kauffman | G06F 16/248 |
| | | | 711/111 |
| 2013/0290388 A1 | 10/2013 | Lenox | |
| 2014/0240335 A1 | 8/2014 | Hu et al. | |
| 2014/0330817 A1 | 11/2014 | Eleftheriou | |
| 2015/0095294 A1* | 4/2015 | Tsuda | G06F 3/061 |
| | | | 707/693 |
| 2015/0161161 A1* | 6/2015 | Iwanaga | G06F 16/13 |
| | | | 707/634 |
| 2017/0052718 A1 | 2/2017 | Abe | |
| 2017/0310783 A1* | 10/2017 | O'Connell, Jr. | H04L 67/2842 |
| 2018/0018270 A1* | 1/2018 | Kilaru | G06F 16/1748 |
| 2018/0059960 A1 | 3/2018 | Hasegawa | |

OTHER PUBLICATIONS

Hasegawa et al., "Caching Files in a Directory," U.S. Appl. No. 16/395,991, filed Apr. 26, 2019.

* cited by examiner

CACHING FILES IN A DIRECTORY

BACKGROUND

The present disclosure relates generally to data storage systems, and more particularly to data caching in a system that includes a tape apparatus.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

SUMMARY

Embodiments of the present disclosure include a method, computer program product, and system for enumerating files on a tape medium and a cache storage device. The method includes receiving a command to enumerate a directory stored on a tape medium. The directory includes a plurality of files. The method further includes determining that the directory has been at least partially cached to a cache storage device. The method further includes determining, for each file of the directory that is stored in the cache storage device, whether the file has been enumerated. In response to determining that the file has not been enumerated, the method includes returning information of the file as a response to the command. The method further includes mounting the tape medium in parallel to retrieving data from the cache storage device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

DETAILED DESCRIPTION

Figure 1A:
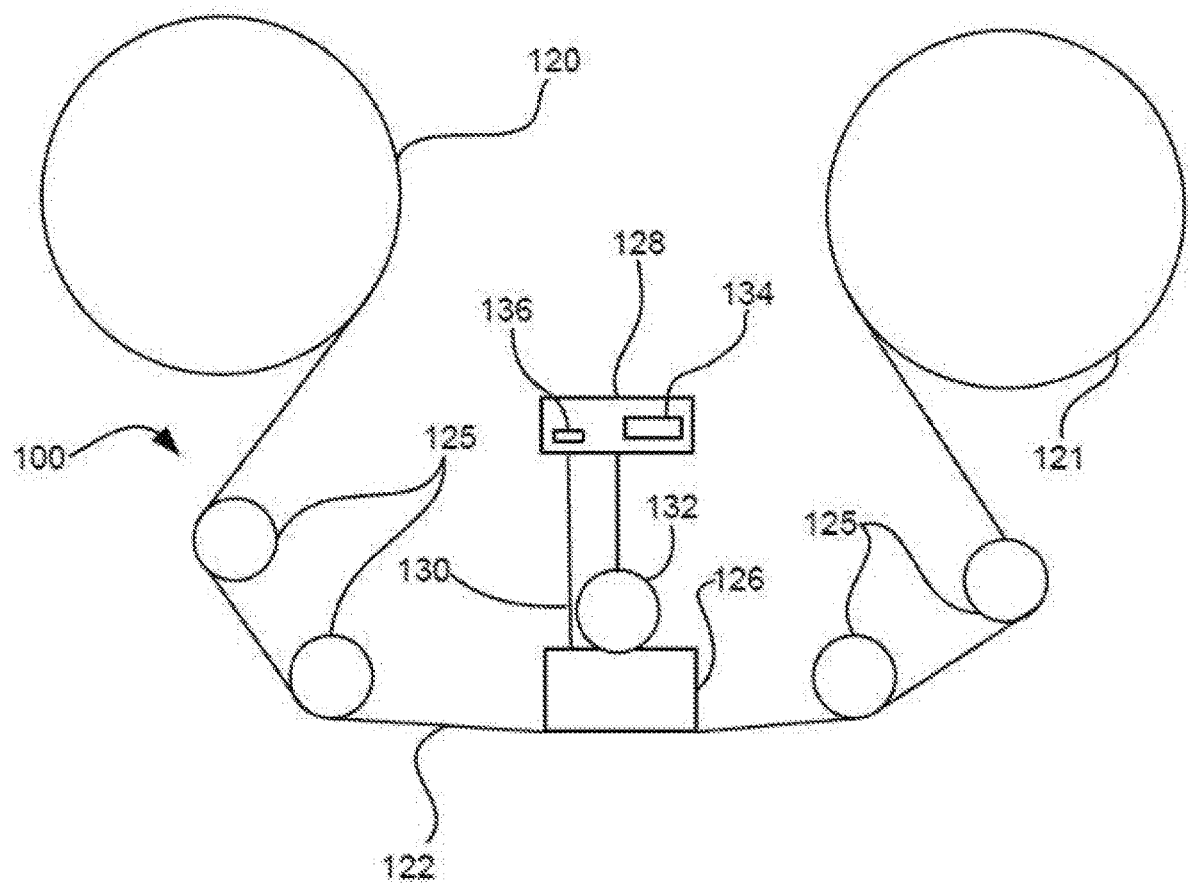
FIG. 1A illustrates a schematic diagram of a simplified tape drive system, in accordance with embodiments of the present disclosure.

Aspects of the present disclosure relate generally to data storage systems, and more particularly to data caching in a system that includes a tape apparatus. While the present disclosure is not necessarily limited to such applications, various aspects of the disclosure may be appreciated through a discussion of various examples using this context.

Linear Tape File System (LTFS) is a software product for implementing simple access to data stored in a data library. LTFS is implemented by storing data on a tape cartridge in a format conforming to the open specifications, the LTFS format. Some implementations of LTFS automatically load and mount a tape to access the tape when an access to the tape occurs without a user explicitly performing operations such as moving the tape from the storage slot to the tape drive in the tape library and mounting/unmounting of a tape.

In some embodiments, metadata (e.g., file name, time stamp, etc.) of files residing in all the media that have ever been mounted are cached in a memory unit. In these embodiments, the tape may be loaded and mounted only when it is necessary to actually access the data itself, such as when creating, updating, and/or reading the files.

Some implementations of LTFS enable a user to access the tape by accessing files or directories in the file system while the user does not have to be bothered by where the tape exists in the tape library and which tape drive should be used to mount the tape. Additionally, in some embodiments, the tape is not unmounted immediately after the access to the file is completed. Instead, the tape is left mounted and, if an access to data on another tape has occurred, another tape drive is used to load and mount the other tape.

A typical use case of LTFS storage is to store video data of a security camera in the LTFS. In this case, if a crime or incident occurs, the directory indicating the data will be copied to an HDD or the like to use the video files. As can be seen in this example, it is a typical mode of use of LTFS systems that multiple files are copied on a per-directory basis from the LTFS.

An application that copies files on a per-directory basis usually calls an API for enumerating the files in the directory (e.g., readdir( ) of Linux® and FindFirstFile( )/FindNextFile( ) of Windows®, etc.). The application sends an inquiry about the information on the files in the directory to the file system, and copies the files sequentially on the basis of the information in the response to the inquiry. For example, xcopy of Windows® or the like copies files in this manner.

When copying of the directory is performed by the application, reading of files will be performed after waiting for a tape to be mounted if the tape is not mounted at the time of reading of the first file. In other words, the tape drive is selected and, if needed, the tape currently used by this tape drive is unmounted and unloaded. Then, the tape to be read is loaded and mounted, and then reading can be performed. As a result, copying may take time as various tapes (also referred to herein as "tape mediums") are unloaded and/or loaded and mounted in order to retrieve the data.

Embodiments of the present disclosure address the challenge of shortening the time required in the copying operation at the time of copying files on a per-directory basis. When multiple files are written in a directory on an LTFS system, some of the files are also written into an HDD or SSD, which acts as a cache. When an application enumerates files in the directory, the LTFS system returns files that are cached in HDD prior to other files. Additionally, when the files that are cached in the HDD are read, the LTFS system returns the data from the cache in parallel with mounting the tape. This scheme makes it possible to shorten the time required for an application to copy files on a per-directory basis.

An example implementation of the present disclosure will be described below based on LTFS LE. Since LTFS LE basically operates as a file system on Linux® or Windows®, embodiments of the present disclosure use a storage device, such as HDD and/or SSD, as a cache.

In some embodiments, the amount (e.g., number, data size, etc.) of files of each directory that are to be cached depends on the systems using the LTFS LE and use cases. For example, since the time for mounting differs depending on the types of tape libraries and tape drives, a large cache capacity needs to be ensured for systems having a long mount time, while a small cache capacity will not cause a problem on a system whose mount time is short. In some embodiments, the size may be defined in advance by LTFS LE or may be specified by a user. When it is specified by the user, for example, it may be specified as an option at the time of starting the LTFS LE.

The information of the file stored in the cache is managed along with the information of the files and directories (which is called "index information") that the LTFS LE has had previously. The index information is held in the memory while the LTFS LE is operating but the index information regarding a tape is also written to the tape itself when the tape is to be unmounted.

An example of the method of recording the cache information using the index information is described below:

LTFS Format Specification requires that the index information be stored in an XML format. The following XML example is part of the index information in some LTFS implementations. This example indicates that the file "FileA" is constituted by the extent of 1048576 bytes (=1 megabytes) from the 1036th block.

<file>
<name>FileA</name>
<length>1048576</length>
<readonly>fal se</readonly>
<creationtime>2012-10-10T01:20:27.000818000Z</creationtime>
<changetime>2012-12-10T00:25:33.000367000Z</changetime>
<modifytime>2012-12-10T00:25:33.000367000Z</modifytime>
<accesstime>2012-12-10T00:25:33.000364000Z</accesstime>
<backuptime>2012-10-10T01:20:27.000818000Z</backuptime>
<fileuid>1014</fileuid>
<extentinfo>
<extent>
<fileoffset>0</fileoffset>
<partition>b</partition>
<startblock>1036</startblock>
<byteoffset>0</byteoffset>
<bytecount>1048576</bytecount>
</extent>
</extentinfo>
<cacheextentinfo>
<extent>
<fileoffset>0</fileoffset>
<partition>/tmp/cache/FileA-1036</partition>
<byteoffset>0</byteoffset>
<bytecount>1048576</bytecount>
</extent>
</cacheextentinfo>
</file>

Thus, the fact that 1048576 bytes of this file A is cached in the HDD as a file "/tmp/cache/FileA-1036" is expressed by the tag "cacheextentinfo" as follows. It is to be understood that the tag name and the configuration of the XML, tag are illustrative examples and may be described by other names and configurations in other implementations.

In some embodiments, upon reception of a write request to write a file in a directory, a processor writes the file in an HDD until a cache size specified for the directory is reached. I parallel, the processor may write the file to a tape. Upon reception of a request to copy the directory from the tape to the HDD (e.g., xcopy of Windows®), the processor may determine whether or not there is any file that is cached in the HDD among the multiple files in the directory. In response to the file cached in the HDD having been found, the processor may read and copy the cached file in parallel with mounting the tape.

In some embodiments, the file is only written to the tape after the cache limit has been reached. If the file is completely written to the cache storage device (e.g., the HDD), the file may not be written to the tape. In other embodiments, the file may be written to the cache storage device and the tape, even if the cache limit is not reached. In these embodiments, the position and size of the cached file on the tape may be written to an index. When the request for copying has been received, this index may be referred to so as to determine whether or not there is any file cached in the HDD, and to determine the location of any file in the HDD and/or on the tape.

Embodiments of the present disclosure include a method, system, and computer program product for enumerating files on a tape medium and a cache storage device. The method includes receiving a command to enumerate a directory having a plurality of files. The directory may be stored on a tape medium. The method further includes determining that the directory has been at least partially cached to a cache storage device. For each file of the directory that is stored in the cache storage device, the method includes determining whether the file has been enumerated and returning information of the file as a response to the command for each file that has not been enumerated. The method further includes mounting the tape medium in parallel to retrieving data from the cache storage device.

In some embodiments, in response to all files of the directory that are stored in the cache storage device having been enumerated, the method includes determining whether any files of the directory that are stored in the tape medium have not yet been enumerated. For each file that is stored in the tape medium that has not been enumerated, the method includes returning information of the file as a response to the command.

In some embodiments, determining that the directory has been at least partially cached to the cache storage device includes determining an identifier for the tape medium. Using the identifier, the method includes retrieving index information for the tape medium from a memory unit and determining whether the directory has been cached using the index information. The index information may include one or more of a directory name for each cached directory, a directory name for each cached file, and/or an identifier of a cache storage device where each cached directory or file is stored. The index information may also include a location of the directory in the cache storage and a location of the directory on the tape medium. In some embodiments, after mounting the tape medium to a tape drive, the tape head of the tape drive may automatically be positioned at the location of the directory on the tape medium. This may speed up the enumeration process because the tape head is preemptively moved into the position of the directory while the cached files are being transferred. In some embodiments, the tape head is moved directly to a location of a first un-cached file of the directory.

Additional embodiments of the present disclosure include a method, system, and computer program product for writing and deleting files on a tape medium using a cache storage device. The method includes receiving a command to write one or more files of a directory to a tape medium. The method further includes identifying a cache limit associated with the directory (and/or tape medium) and determining whether an amount of data of the directory that has already been written to a cache storage device exceeds the cache limit. The cache limit may be based on, for example, an amount of time required to mount the tape medium, or it may be specified by a user at a time of starting the LTFS. If the amount of data does not exceed the cache limit, data of the one or more files is written to the cache storage device. In some embodiments, the data is also written to the tape medium in parallel.

In some embodiments, only a portion of the one or more files is written to the cache storage device. The portion may be written such that a total amount of data of the directory stored on the cache storage device does not exceed the cache limit. Once the cache limit is reached, no additional data of the directory is written to the cache storage device. However, the data may continue to be written to the tape medium until a complete copy of the one or more files is stored on the tape medium. Once all of the data has been written to the cache storage device and/or the tape medium, an index of the directory may be updated. The index may be stored in a memory unit.

In some embodiments, one or more files stored to the cache storage device and/or the tape medium may be deleted in response to a delete command. In these embodiments, a processor may delete whatever portion of the one or more files is cached from the cache storage device, and the processor may update an index in a memory.

Additional embodiments of the present disclosure include a method, system, and computer program product for reading a file that is stored on a tape medium and cached on a cache storage device. The method includes receiving a command to read a file that is stored on a tape medium. The method further includes determining whether the file is part of a directory that has been cached to a cache storage device. If the file is part of a cached directory, the data of the file may be read from the cache storage device. In some embodiments, the tape medium may be mounted in parallel with the data being read from the cache storage device.

In some embodiments, only a portion of the file is stored on the cache storage device. In these embodiments, the cached portion of the file may be read from the cache storage device, while the remaining data may be read from the tape medium. In some embodiments, all of the data of the file may be read from the tape medium, even if part of the file is cached.

Turning now to the figures, FIG. 1A illustrates a simplified tape drive 100 of a tape-based data storage system, which may be employed in the context of the present disclosure. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments.

The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
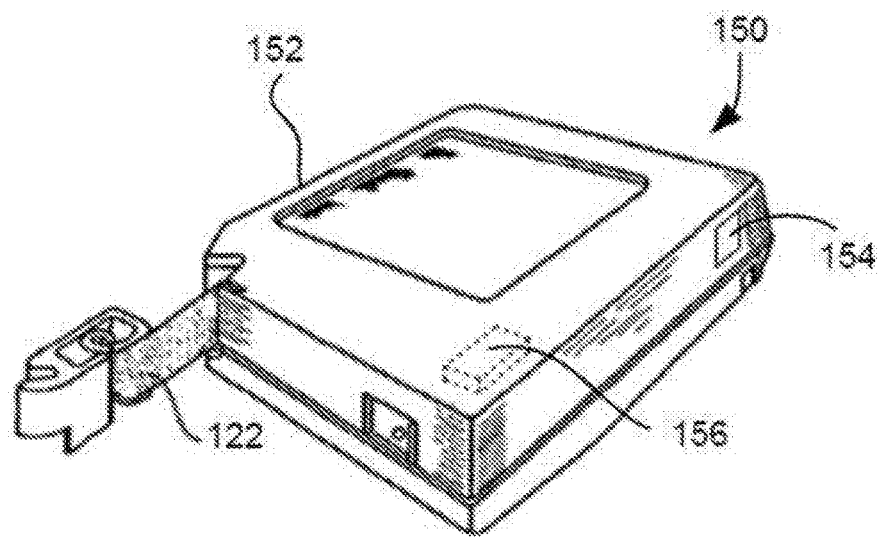
FIG. 1B illustrates a schematic diagram of a tape cartridge, in accordance with embodiments of the present disclosure.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
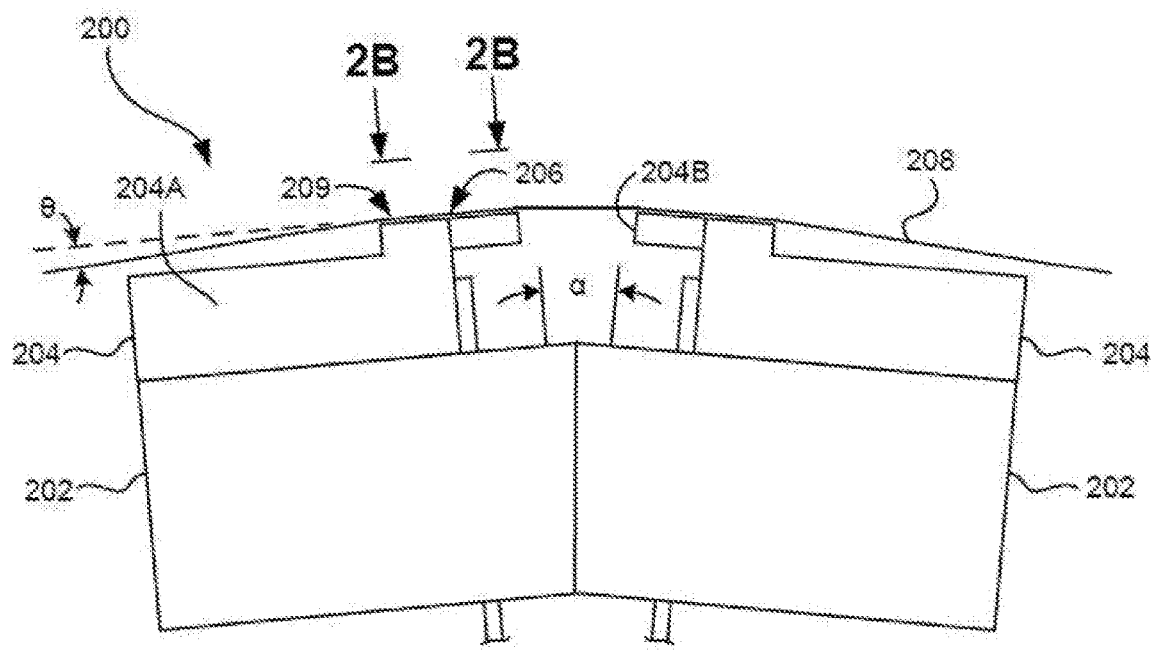
FIG. 2A illustrates a side view of a flat-lapped, bi-directional, two-module magnetic tape head, in accordance with embodiments of the present disclosure.

By way of example, FIG. 2A illustrates a side view of a flat-lapped, bi-directional, two-module magnetic tape head 200 which may be implemented in the context of the present disclosure. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
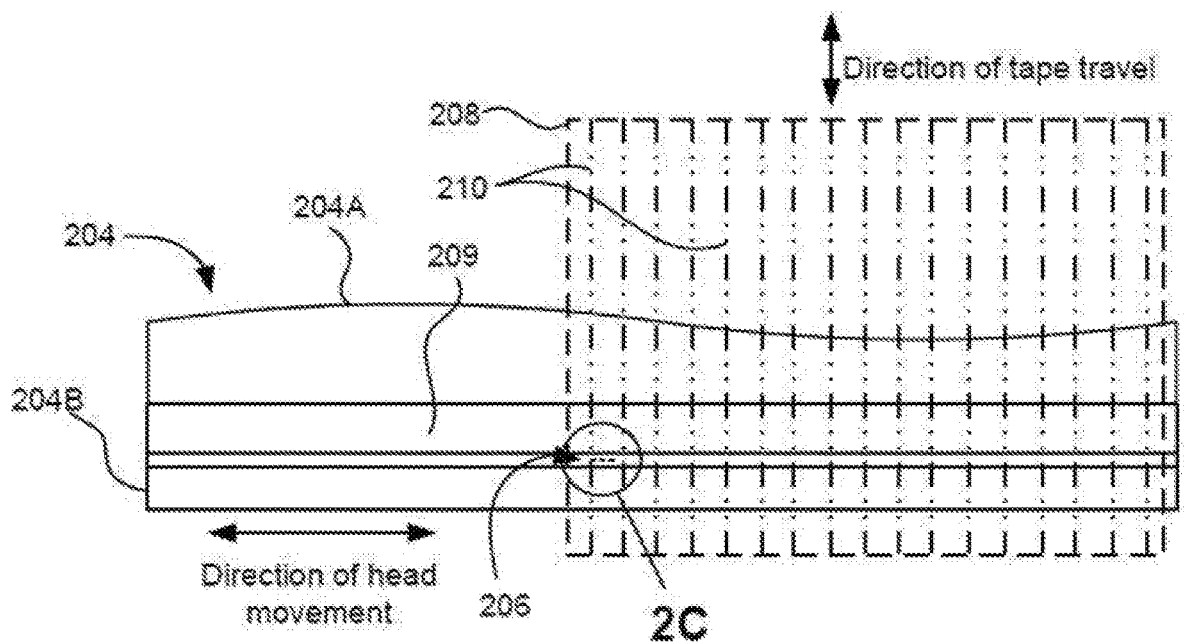
FIG. 2B illustrates a tape bearing surface view taken from Line 2B of FIG. 2A, in accordance with embodiments of the present disclosure.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
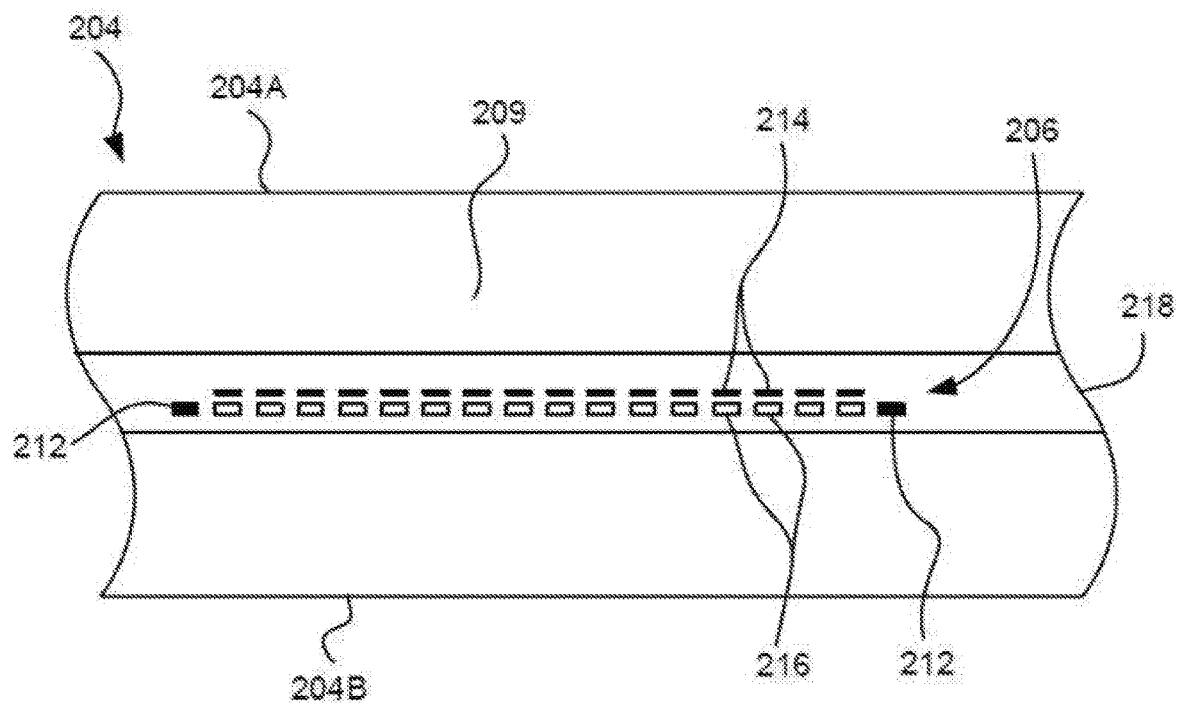
FIG. 2C illustrates a detailed view taken from Circle 2C of FIG. 2B, in accordance with embodiments of the present disclosure.

FIG. 2C depicts a plurality of readers and/or writers 206 formed in a gap 218 on the module 204 in Circle 2C of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2A and 2B-2C together, each module 204 may include a complementary set of readers and/or writers 206 for such things as bi-directional reading and writing, read-while-write capability, backward compatibility, etc.

Figure 2D:
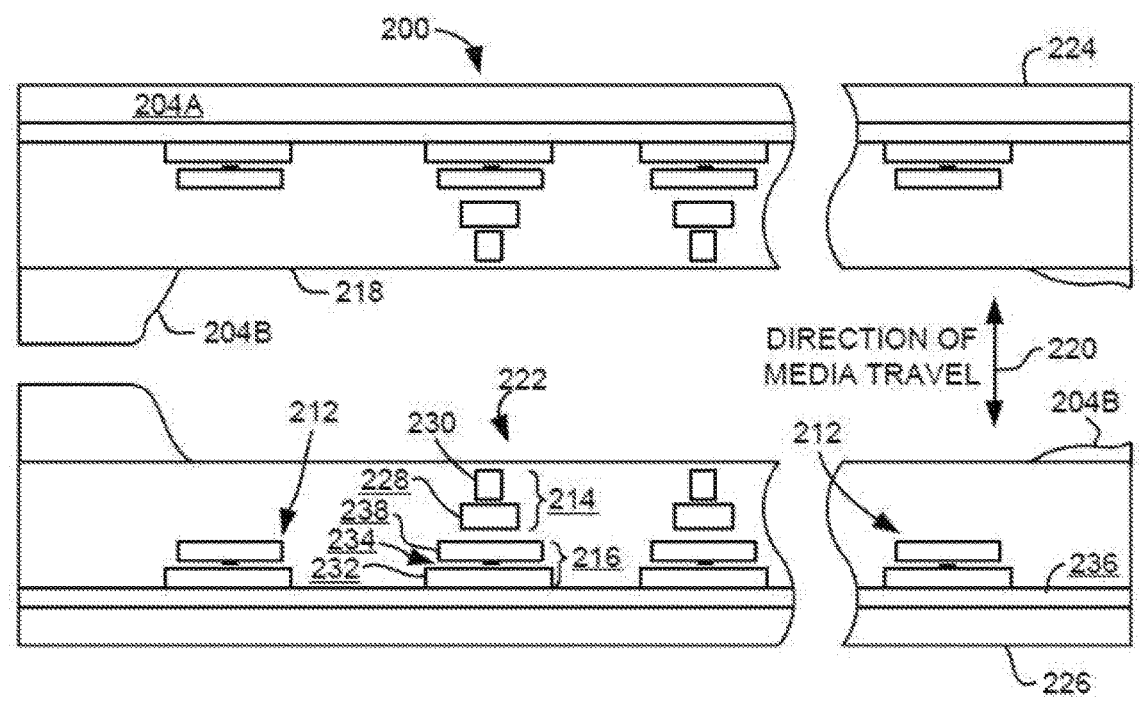
FIG. 2D illustrates a detailed view of a partial tape bearing surface of a pair of modules, in accordance with embodiments of the present disclosure.

FIG. 2D shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative insulating layer 236. The writers 214 and the readers 216 are aligned parallel to an intended direction of travel of a tape medium thereacross to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
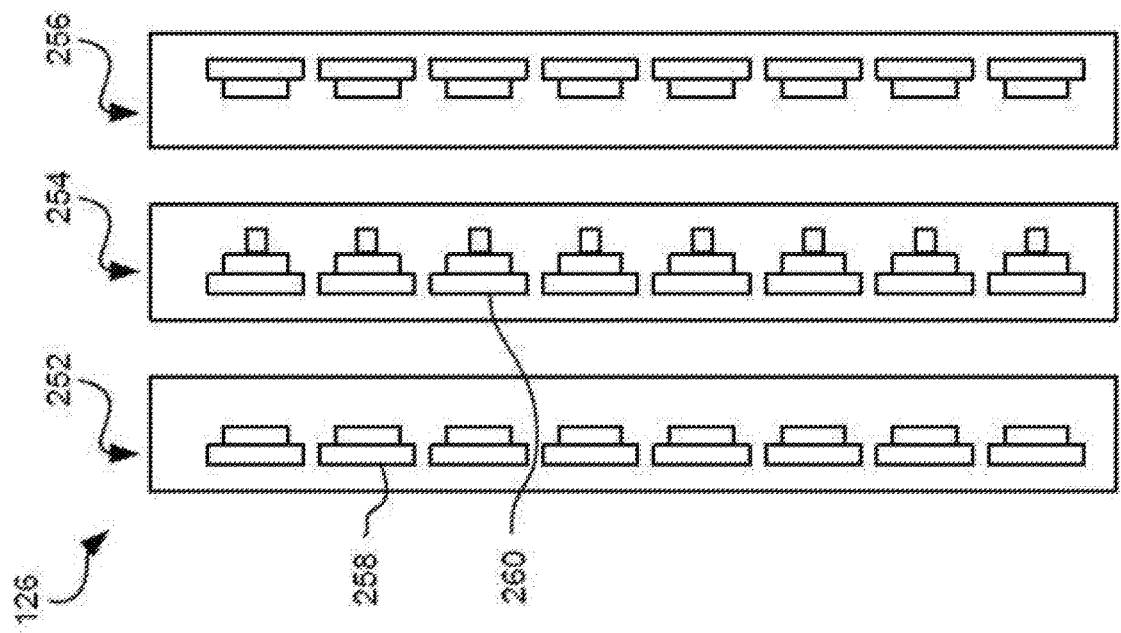
FIG. 4 illustrates a partial tape bearing surface view of a magnetic head having a read-write-read configuration, in accordance with embodiments of the present disclosure.
Figure 3:
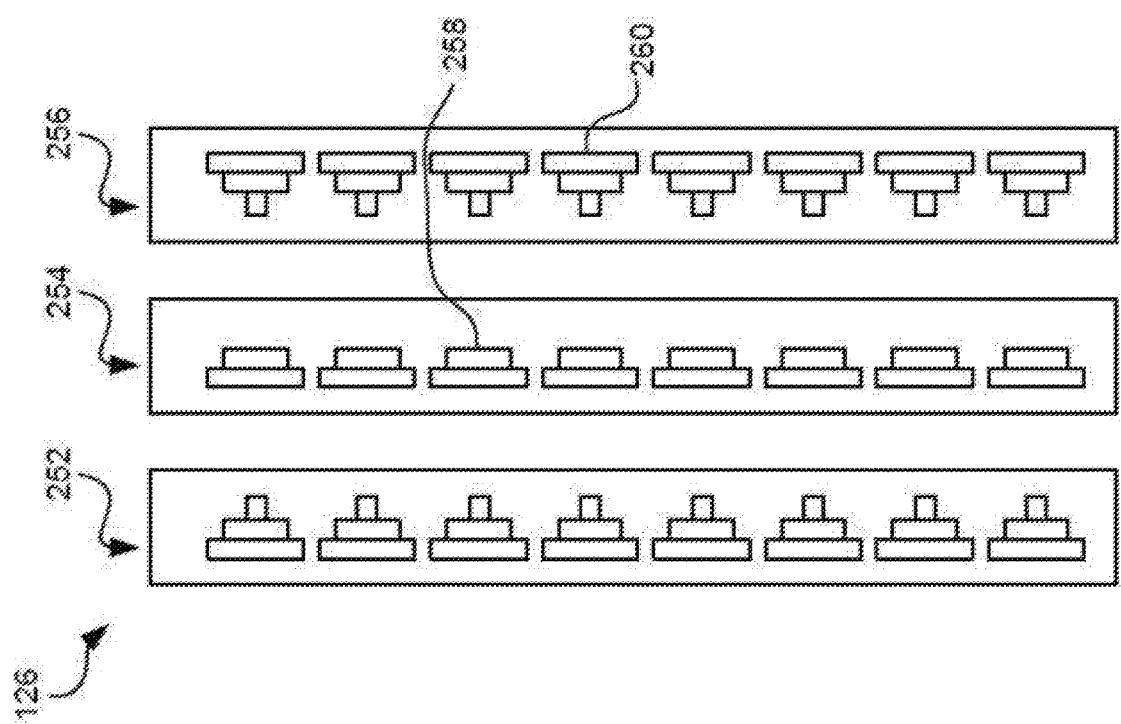
FIG. 3 illustrates a partial tape bearing surface view of a magnetic head having a write-read-write configuration, in accordance with embodiments of the present disclosure.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-W-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present disclosure. One skilled in the art apprised with the teachings herein will appreciate how permutations of the present disclosure would apply to configurations other than a W-R-W configuration.

Figure 5:
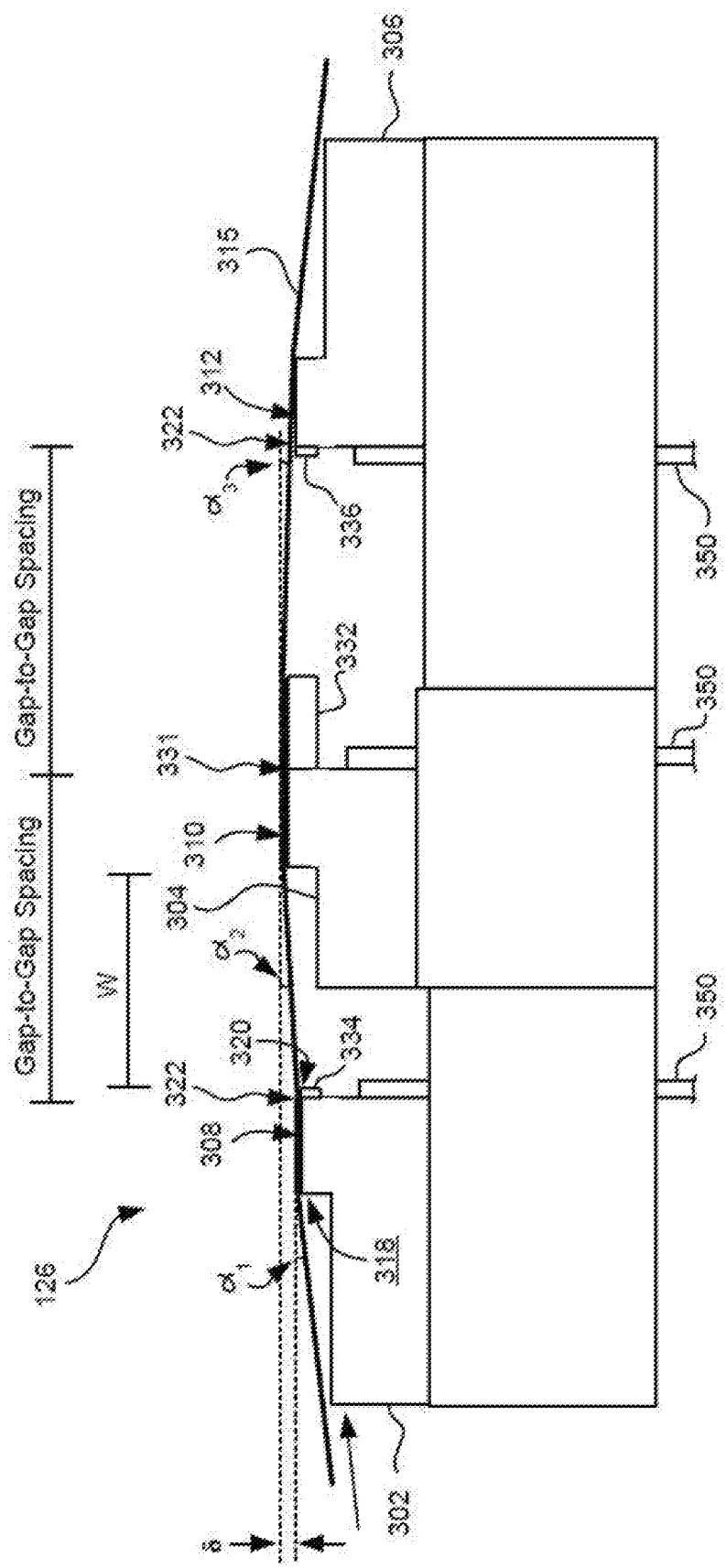
FIG. 5 illustrates a side view of a magnetic tape head with three modules where the modules all generally lie along about parallel planes, in accordance with embodiments of the present disclosure.

FIG. 5 illustrates a magnetic head 126 according to one embodiment of the present disclosure that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
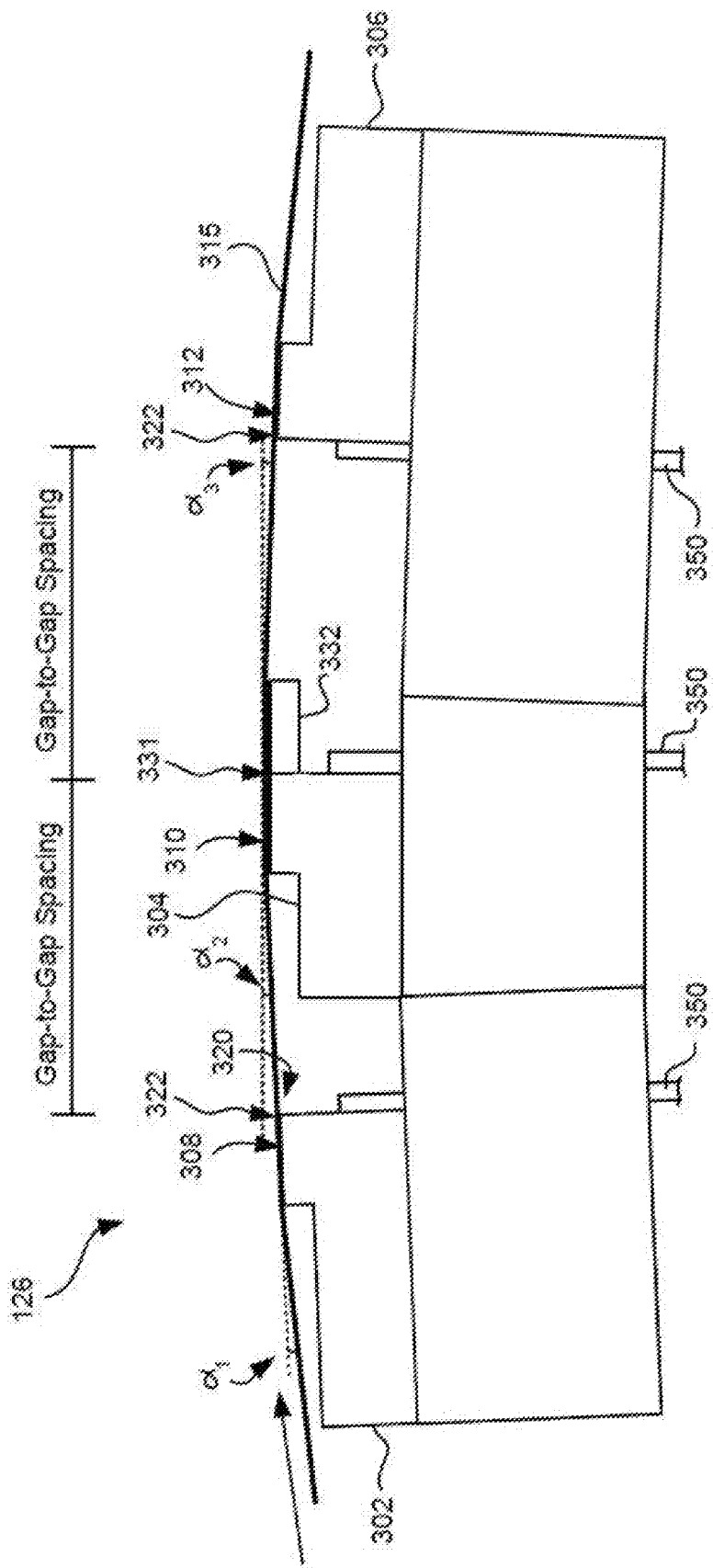
FIG. 6 illustrates a side view of a magnetic tape head with three modules in a tangent (angled) configuration, in accordance with embodiments of the present disclosure.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ s of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by a skiving edge 318 of the leading module 302 has been found by experimentation to be sufficient to keep the tape adhered to the tape bearing surface 308 of the leading module 302. A trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, transducers 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
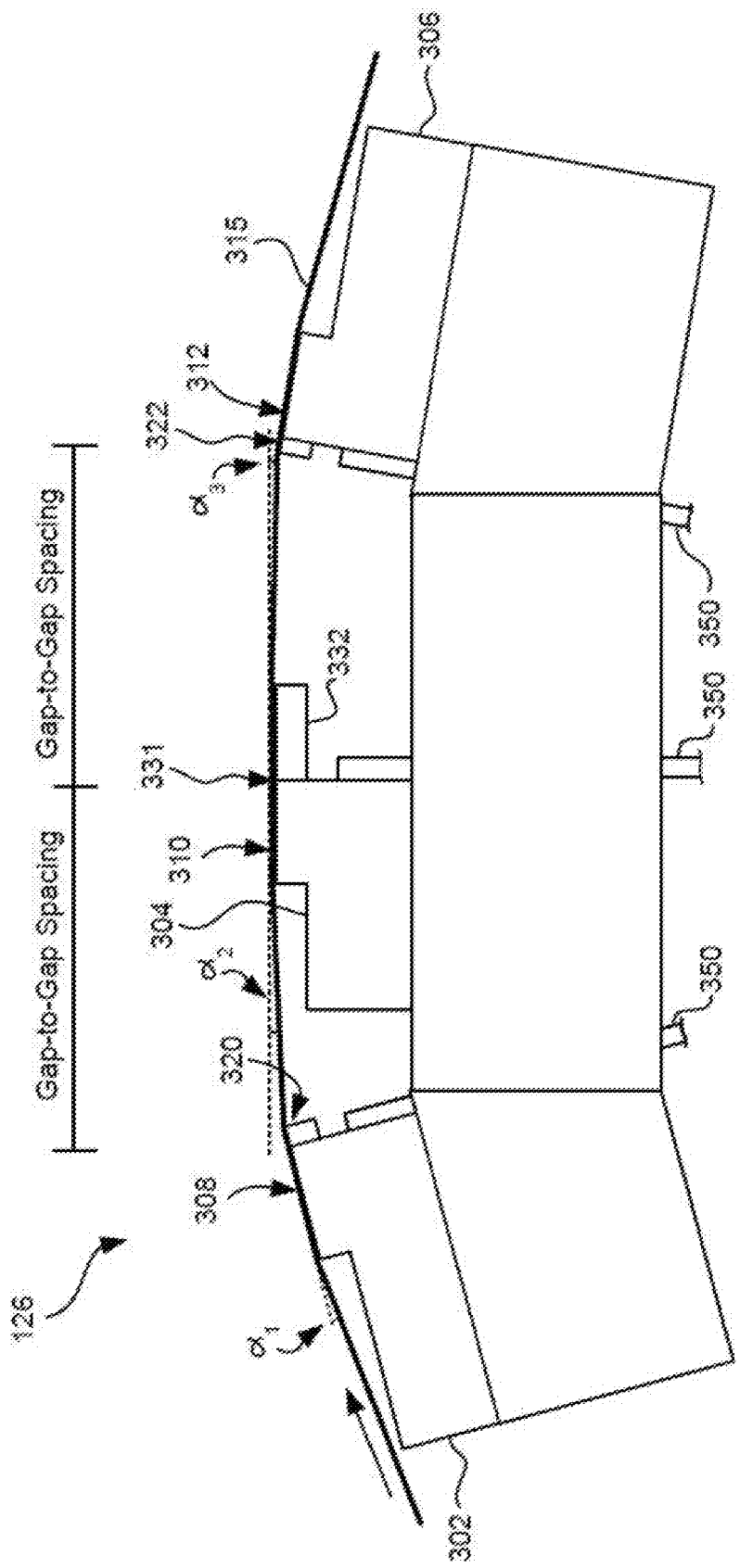
FIG. 7 illustrates a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore, a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module tape head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

Figure 8A:
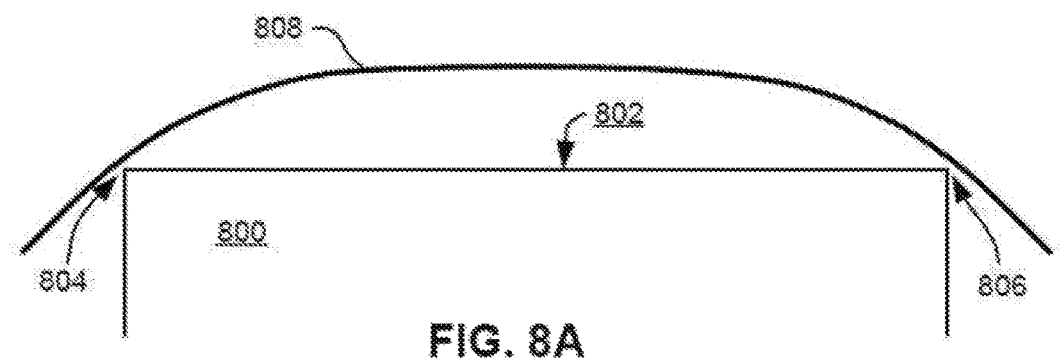
FIGS. 8A-8C illustrate schematics depicting the principles of tape tenting, in accordance with embodiments of the present disclosure.
Figure 8B:
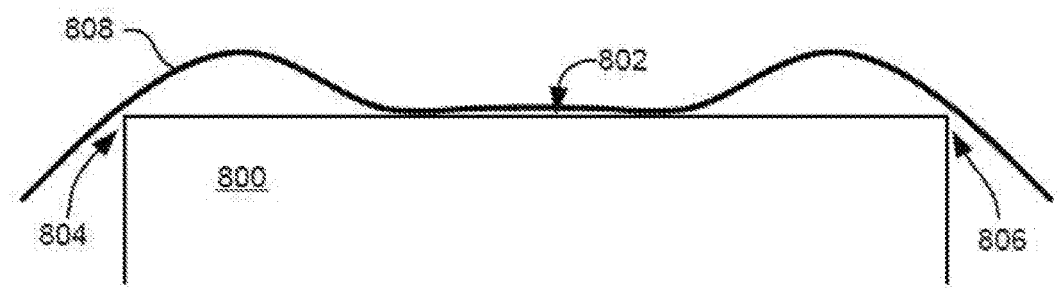
Figure 8C:
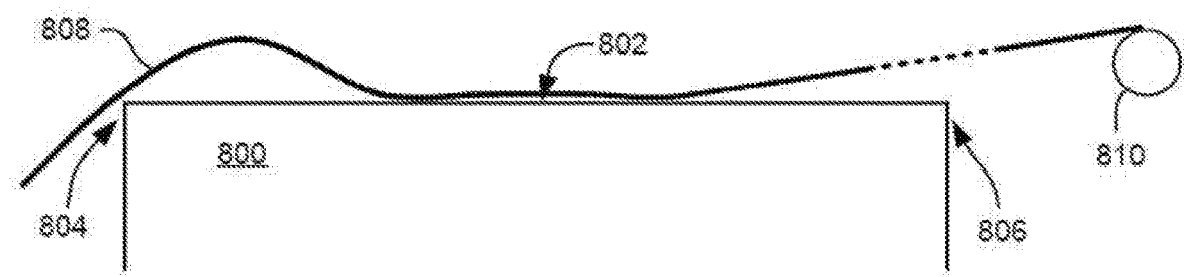

As a tape is run over a module, it is preferred that the tape passes sufficiently close to magnetic transducers on the module such that reading and/or writing is efficiently performed, e.g., with a low error rate. According to some approaches, tape tenting may be used to ensure the tape passes sufficiently close to the portion of the module having the magnetic transducers. To better understand this process, FIGS. 8A-8C illustrate the principles of tape tenting. FIG. 8A shows a module 800 having an upper tape bearing surface 802 extending between opposite edges 804, 806. A stationary tape 808 is shown wrapping around the edges 804, 806. As shown, the bending stiffness of the tape 808 lifts the tape off of the tape bearing surface 802. Tape tension tends to flatten the tape profile, as shown in FIG. 8A. Where tape tension is minimal, the curvature of the tape is more parabolic than shown.

FIG. 8B depicts the tape 808 in motion. The leading edge, i.e., the first edge the tape encounters when moving, may serve to skive air from the tape, thereby creating a subambient air pressure between the tape 808 and the tape bearing surface 802. In FIG. 8B, the leading edge is the left edge and the right edge is the trailing edge when the tape is moving left to right. As a result, atmospheric pressure above the tape urges the tape toward the tape bearing surface 802, thereby creating tape tenting proximate each of the edges. The tape bending stiffness resists the effect of the atmospheric pressure, thereby causing the tape tenting proximate both the leading and trailing edges. Modeling predicts that the two tents are very similar in shape.

FIG. 8C depicts how the subambient pressure urges the tape 808 toward the tape bearing surface 802 even when a trailing guide 810 is positioned above the plane of the tape bearing surface.

It follows that tape tenting may be used to direct the path of a tape as it passes over a module. As previously mentioned, tape tenting may be used to ensure the tape passes sufficiently close to the portion of the module having the magnetic transducers, preferably such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various embodiments herein can be implemented with a wide range of file system formats, including for example IBM Spectrum Archive Library Edition (LTFS LE). However, to provide a context, and solely to assist the reader, some of the embodiments below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 9:
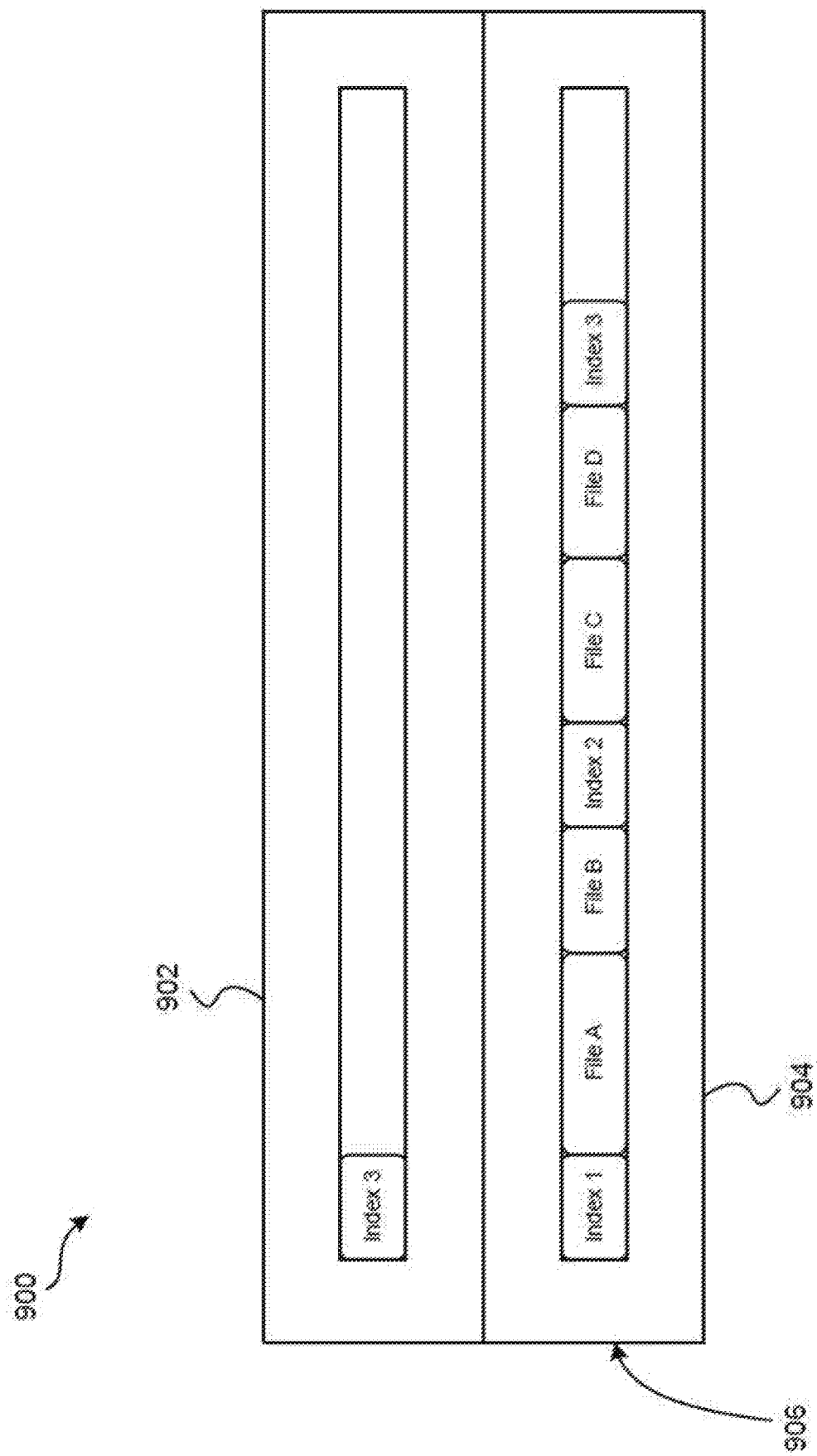
FIG. 9 illustrates a representational diagram of files and indexes stored on a magnetic tape, in accordance with embodiments of the present disclosure.

Looking to FIG. 9, a magnetic tape 900 having an index partition 902 and a data partition 904 is illustrated according to one embodiment. As shown, data files and indexes are stored on the tape. The LTFS format allows for index information to be recorded in the index partition 902 at the beginning of tape 906, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 9, a most recent version of metadata Index 3 is recorded in the index partition 902 at the beginning of the tape 906. Conversely, all three version of metadata Index 1, Index 2, Index 3 as well as data File A, File B, File C, File D are recorded in the data partition 904 of the tape. Although Index 1 and Index 2 are old (e.g., outdated) indexes, because information is written to tape by appending it to the end of the previously written data as described above, these old indexes Index 1, Index 2 remain stored on the tape 900 in the data partition 904 without being overwritten.

The metadata may be updated in the index partition 902 and/or the data partition 904 the same or differently depending on the desired embodiment. According to some embodiments, the metadata of the index and/or data partitions 902, 904 may be updated in response to the tape being unmounted, e.g., such that the index may be read quickly from the index partition when that tape is mounted again. The metadata is preferably also written in the data partition 904 so the tape may be mounted using the metadata recorded in the data partition 904, e.g., as a backup option.

According to one example, which is no way intended to limit the disclosure, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Figure 10:
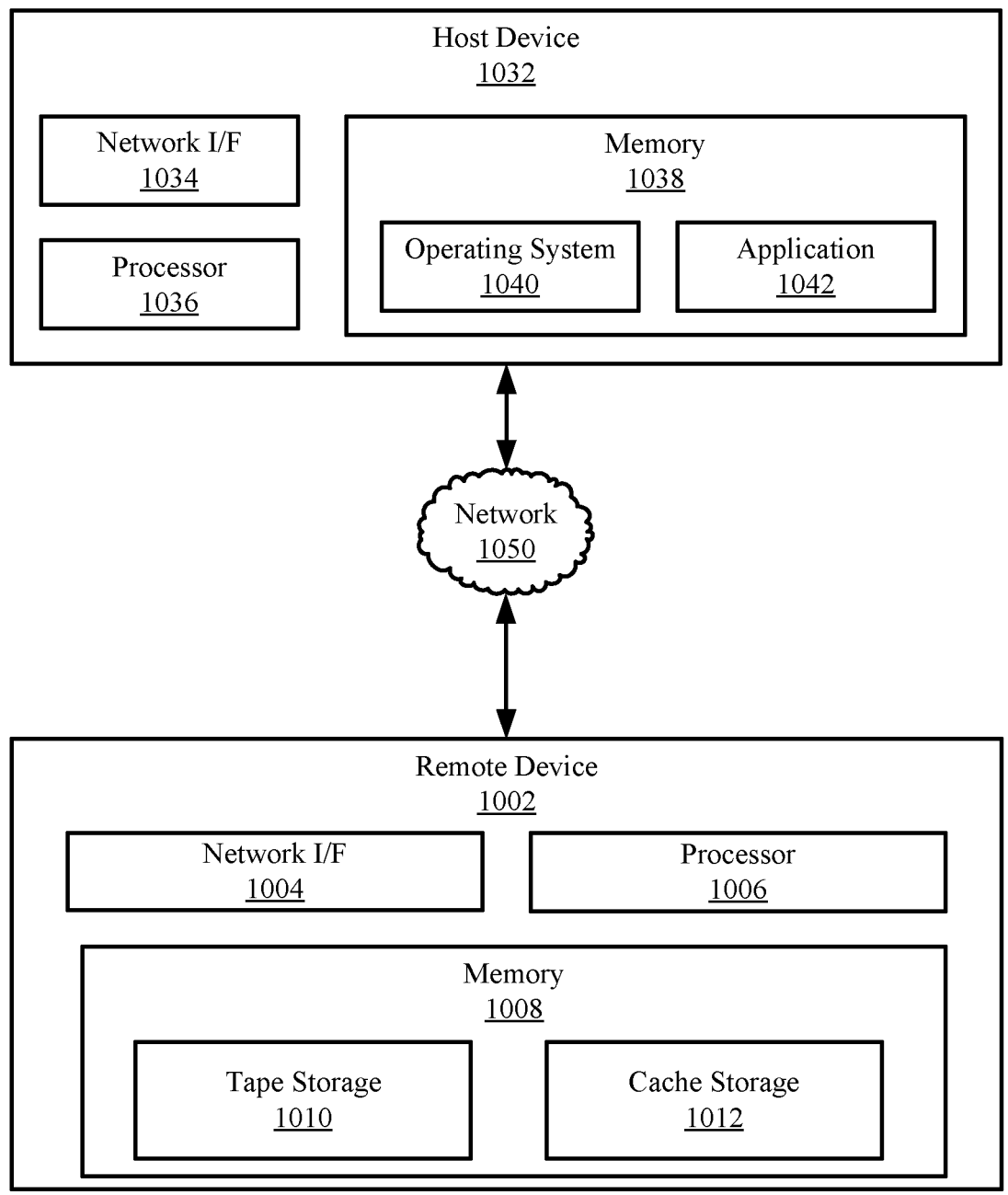
FIG. 10 illustrates an example computing environment in which various embodiments of the present disclosure may be implemented.

Referring now to FIG. 10, illustrated is example computing environment 1000 in which various embodiments of the present disclosure may be implemented. The computing environment 1000 includes a host device 1032 and a remote device 1002. The host device 1032 is communicatively coupled with the remote device 1002 using a network 1050.

Consistent with various embodiments, the host device 1032 and the remote device 1002 may be computer systems. For example, in some embodiments the host device 1032 and the remote device 1002 may be server computers. The host device 1032 includes a processor 1036 and a memory 1038. The memory 1038 may include an operating system 1040 and one or more applications 1042 configured to utilize (e.g., access) data stored in the remote device 1002. Likewise, the remote device 1002 includes one or more processors 1006 and one or more memories 1008. The memories 1008 of the remote device 1002 may include tape storage 1010 and cache storage 1012. The tape storage 1010 may include any number and/or type of tape storage devices. The cache storage 1012 may include any number and/or type of persistent storage devices (e.g., HDDs, SSDs, etc.) to act as a cache.

The remote device 1002 and the host device 1032 may be configured to communicate with each other through an internal or external network interface 1004 and 1034. The network interfaces 1004 and 1034 may be, e.g., modems or network interface cards. For example, the network interfaces 1004 and 1034 may enable the host device 1032 and the remote device 1002 to connect to the network 1050 and communicate with each other.

The remote device 1002 and/or the host device 1032 may be equipped with a display or monitor. Additionally, the remote device 1002 and/or the host device 1032 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.).

The remote device 1002 and the host device 1032 may be distant from each other and communicate over a network 1050. In some embodiments, the host device 1032 may be a central hub from which the remote device 1002 can establish a communication connection, such as in a client-server networking model. Alternatively, the host device 1032 and the remote device 1002 may be configured in any other suitable networking relationship (e.g., in a peer-to-peer configuration or using any other network topology).

In some embodiments, the network 1050 can be implemented using any number of any suitable communications media. For example, the network 1050 may be a wide area network (WAN), a local area network (LAN), a SAN, an internet, or an intranet. In certain embodiments, the remote device 1002 and the host device 1032 may be local to each other, and communicate via any appropriate local communication medium. For example, the remote device 1002 and the host device 1032 may communicate using a SAN, one or more hardwire connections, a switch such as a fibre channel switch or FICON director, a wireless link or router, or an intranet. In some embodiments, the remote device 1002 and the host device 1032 may be communicatively coupled using a combination of one or more networks and/or one or more local connections. For example, the remote device 1002 may be hardwired to the host device 1032 (e.g., connected with a fibre channel cable) while a second remote device (not shown) may communicate with the host device using the network 1050 (e.g., over the Internet).

In some embodiments, the network 1050 may be a telecommunication network. The telecommunication network may include one or more cellular communication towers, which may be a fixed-location transceiver that wirelessly communicates directly with a mobile communication terminal. Furthermore, the network may include one or more wireless communication links between the remote device 1002 and the host device 1032. The wireless communications links may include, for example, shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), or any other wireless communication technology or standard to establish a wireless communications link.

In some embodiments, the network 1050 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 1050.

In one illustrative example embodiment, the host device 1032 can be configured to store one or more directories (e.g., each having one or more files) on the remote device 1002 using the tape storage 1010. Additionally, the cache storage 1012 (e.g., an HDD) may be used to cache a certain amount of the directory for quicker access (e.g., reading or writing). The amount of data stored to the cache storage 1012 (referred to herein as the cache limit) may be based on, for example, an amount of time necessary to mount the tape medium to which the directory is being stored, a ratio of the amount of cache storage space to tape medium space in the remote device 1002, an importance of the data being stored, and/or user input, among other factors recognized by those skilled in the art. The cache limit may be specific to the system (e.g., remote device 1002), the tape medium (e.g., the specific tape medium and/or drive being used to store the data), and/or the directory, among other factors recognized by those skilled in the art.

For example, a first directory may be saved on the tape storage device 1010. While writing the data for the directory to a particular tape storage medium, the remote device may also determine an amount of data of the directory to store in the cache storage 1012. The amount of data to store in the cache may be based on how long the particular tape storage medium takes to mount. The longer it takes to mount the tape storage medium, the larger the cache limit. While writing the data of the first directory to the particular tape storage medium, the remote device 1002 may, in parallel, write data to the cache storage 1012 until the cache limit for the directory is reached. Once the cache limit is reached, the remote device stops writing data to the cache storage 1012 and continues writing the data to the tape storage medium until all of the data is stored on the tape storage medium.

It is noted that FIG. 10 is intended to depict the representative major components of an exemplary computing environment 1000. In some embodiments, however, individual components may have greater or lesser complexity than as represented in FIG. 10, components other than or in addition to those shown in FIG. 10 may be present, and the number, type, and configuration of such components may vary. Likewise, one or more components shown within the computing environment 1000 may not be present, and the arrangement of components may vary.

For example, while FIG. 10 illustrates a computing environment 1000 with a single host device 1032 and a single remote device 1002, suitable computing environments for implementing embodiments of this disclosure may include any number of remote and host devices. The various models, modules, systems, and components illustrated in FIG. 10 may exist, if at all, across a plurality of host devices and remote devices. For example, in some embodiments, all of the functions described herein exist in a single host device, and there may be no remote device.

Figure 11:
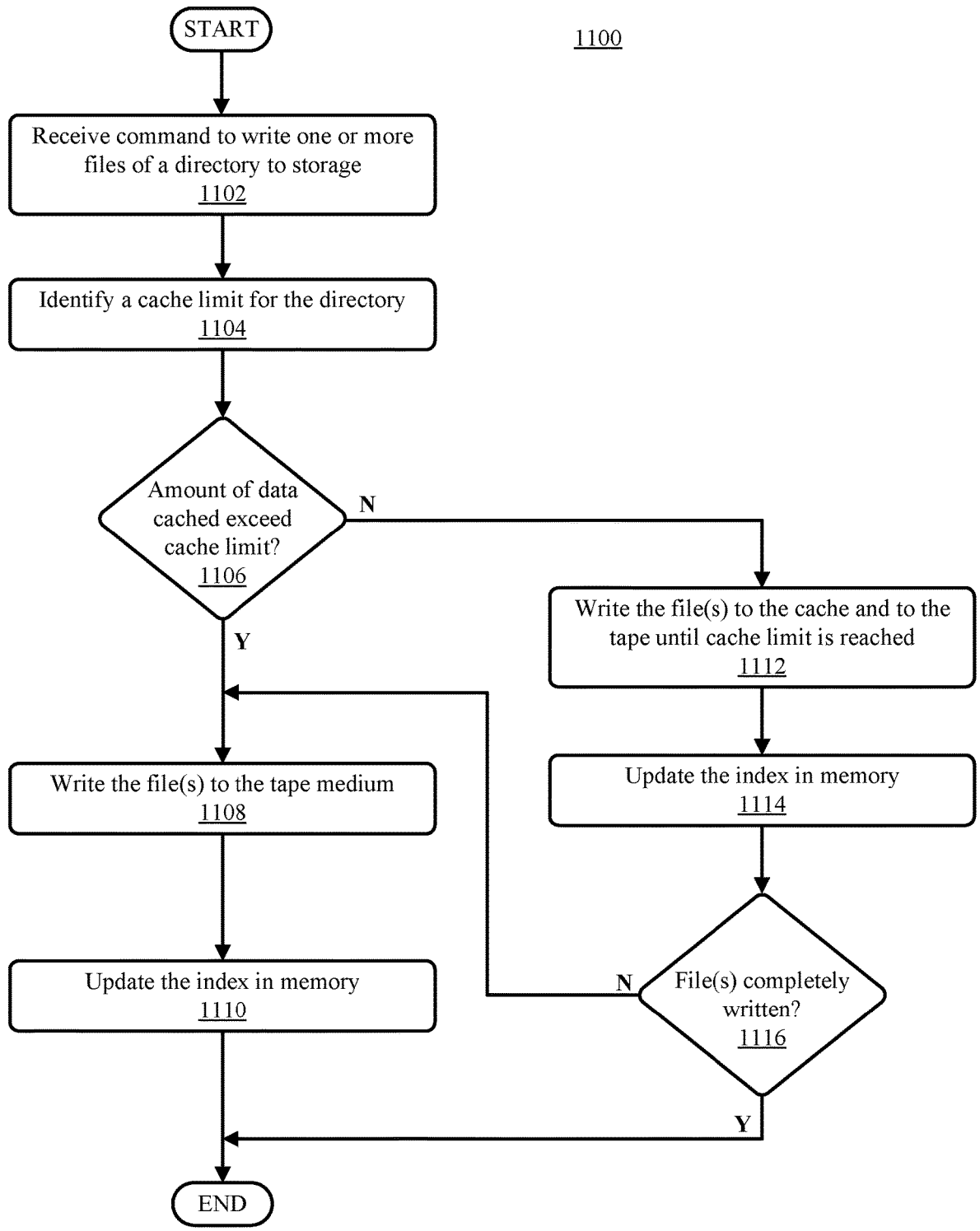
FIG. 11 illustrates a flowchart of an example method for writing one or more files of a directory to storage, in accordance with embodiments of the present disclosure.

Referring now to FIG. 11, illustrated is a flowchart of an example method 1100 for writing one or more files of a directory to storage, in accordance with embodiments of the present disclosure. The method 1100 may be performed by processing logic that comprises hardware (e.g., circuitry, dedicated logic, programmable logic, microcode, etc.), software (e.g., instructions run on a processor to perform hardware simulation), firmware, and/or a combination thereof. In some embodiments, the method 1100 is a computer-implemented method performed by a processor or controller (e.g., a storage controller). The method 1100 may begin at operation 1102, wherein a processor may receive a command to write one or more files of a directory to storage.

In some embodiments, an application running on a computer system may generate a command to write the directory to a storage system (e.g., to a tape storage medium). The command may indicate, for example, which tape storage medium the directory should be written to. Additionally, the command may indicate whether the directory is to be cached for future access. In some embodiments, the system may determine whether the directory is to be cached using other information and/or rules.

After receiving the command to write the file(s) to the storage system, the system may identify a cache limit for the directory (and/or for the file(s)) at operation 1104. As described herein, the cache limit may be based on, for example, attributes of the particular tape storage medium to which the file(s) are being saved and/or attributes of the cache storage device(s). For example, if the processor determines that the tape storage medium takes 15 seconds to be mounted and made operational, and data can be accessed from the cache device (e.g., an HDD) at 100 MB/s on average, the processor may set a cache limit of 1.5 GB (100 MB/s multiplied by 15 seconds) for the directory. Accordingly, when an access request for data of the directory is received by the processor, there is sufficient data in the cache storage to return while waiting for the tape medium to be mounted.

At decision block 1106, the processor determines whether the amount of data already cached for the directory meets or exceeds the cache limit. For example, if the directory was previously written to storage, and an application subsequently updates and/or adds files in the directory, the amount of space allocated to cache the file(s) of the directory may have already been reached, and no additional caching may be performed. The processor may compare the amount of data cached for the directory, which may be saved as metadata in a memory unit, to the cache limit to determine whether the amount of data already cached exceeds the cache limit.

If the amount of data already cached exceeds the cache limit, the processor continues writing the file(s) to the tape medium until the directory is fully saved on the tape medium at operation 1108. The processor then updates the index in the memory to indicate that the directory has been stored on the tape medium at operation 1110, and the method 1100 ends.

If the processor determines at decision block 1106 that the amount of data cached does not exceed the cache limit, the processor writes the file(s) to the cache and to the tape medium until the cache limit is reached at operation 1112. Writing to the cache and to the tape medium may be performed in parallel (e.g., simultaneously). Upon reaching the cache limit or the files being completely written, the processor updates the index in the memory at operation 1114.

At decision block 1116, the processor determines whether all files were completely written. If all files were completed written to the tape medium and the cache, the method 1100 ends. Otherwise, the method continues at operation 1108, and the remaining files are written to the tape medium. The index is then updated at operation 1110 and the method 1100 ends.

Figure 12:
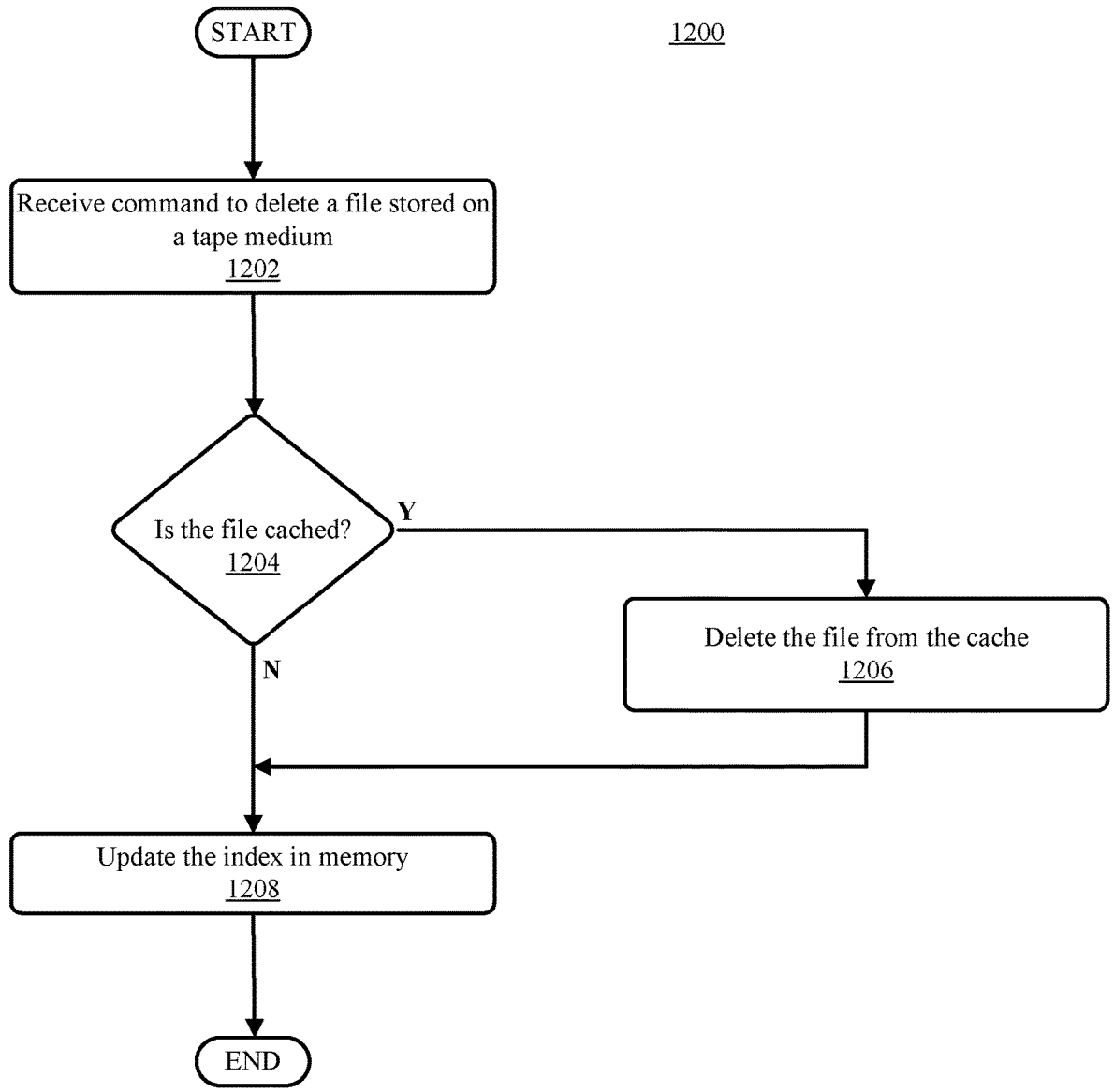
FIG. 12 illustrates a flowchart of an example method for deleting one or more files of a directory from a storage, in accordance with embodiments of the present disclosure.

Referring now to FIG. 12, illustrated is a flowchart of an example method 1200 for deleting one or more cached files of a directory from a storage, in accordance with embodiments of the present disclosure. The method 1200 may be performed by processing logic that comprises hardware (e.g., circuitry, dedicated logic, programmable logic, microcode, etc.), software (e.g., instructions run on a processor to perform hardware simulation), firmware, and/or a combination thereof. In some embodiments, the method 1200 is a computer-implemented method performed by a processor or controller (e.g., a storage controller). The method 1200 may begin at operation 1202, wherein a processor may receive a command to delete a file stored on a tape medium.

After receiving the command to delete the file, the processor may determine whether the file is cached at decision block 1204. In some embodiments, the processor may retrieve index information for the tape medium. The index information may include information relating to all files and/or directories stored on the tape medium, including whether a particular file and/or directory is cached. The processor may then determine, using the index information, whether the file has been previously cached (e.g., by determining whether it is in a cached directory, or whether it has otherwise been cached).

If the processor determines at decision block 1204 that the file has not been cached, the processor updates the index in the memory. Because the index information is used to locate and retrieve data from the tape medium, updating the index information (e.g., to delete information about the file from the index) has the effect of deleting the file from the tape medium. If the processor determines at decision block 1204 that the file has been cached, the processor deletes the file from the cache (e.g., deletes it from the HDD/SSD acting as a cache storage device) at operation 1206. The processor also updates the index in the memory at operation 1208, and the method 1200 ends. It should be understood that operations 1206 and 1208 may be performed sequentially in any order, or they may be performed in parallel.

Figure 13:
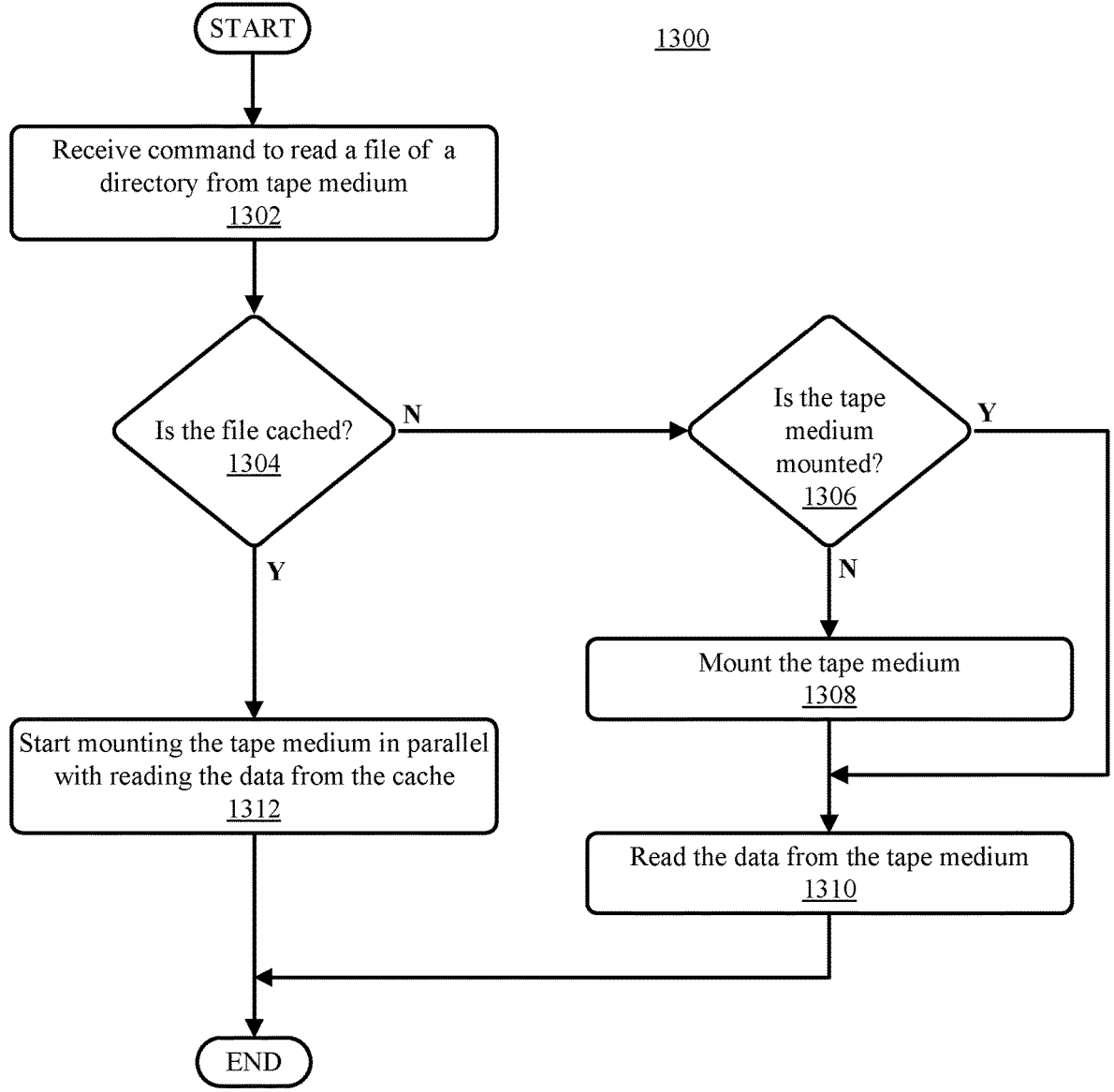
FIG. 13 illustrates a flowchart of an example method for reading a file from a tape medium, in accordance with embodiments of the present disclosure.

Referring now to FIG. 13, illustrated is a flowchart of an example method 1300 for reading a file from a tape medium and a cache storage system, in accordance with embodiments of the present disclosure. The method 1300 may be performed by processing logic that comprises hardware (e.g., circuitry, dedicated logic, programmable logic, microcode, etc.), software (e.g., instructions run on a processor to perform hardware simulation), firmware, and/or a combination thereof. In some embodiments, the method 1300 is a computer-implemented method performed by a processor or controller (e.g., a storage controller). The method 1300 may begin at operation 1302, wherein a processor may receive a command (e.g., from an application) to read a file from a tape medium. The file may be part of a cached directory.

At decision block 1304, the processor determines whether the file is cached. As described herein, the processor may use index information to determine whether the file has been cached. If the processor determines that the file has been cached, the processor begins mounting the tape medium in parallel with reading the data from the cache at operation 1312. The data read from the cache may be returned while the tape medium is still in the process of being mounted, thereby allowing the application to begin using and/or processing the data prior to the tape medium being operational.

If the processor determines that the file is not cached at decision block 1304, the processor determines whether the tape medium is mounted at decision block 1306. If the tape medium is already mounted, the processor reads the data from the tape medium at operation 1310 and the method 1300 ends. Otherwise, the processor mounts the tape medium at operation 1308 before reading the data at operation 1310.

Figure 14:
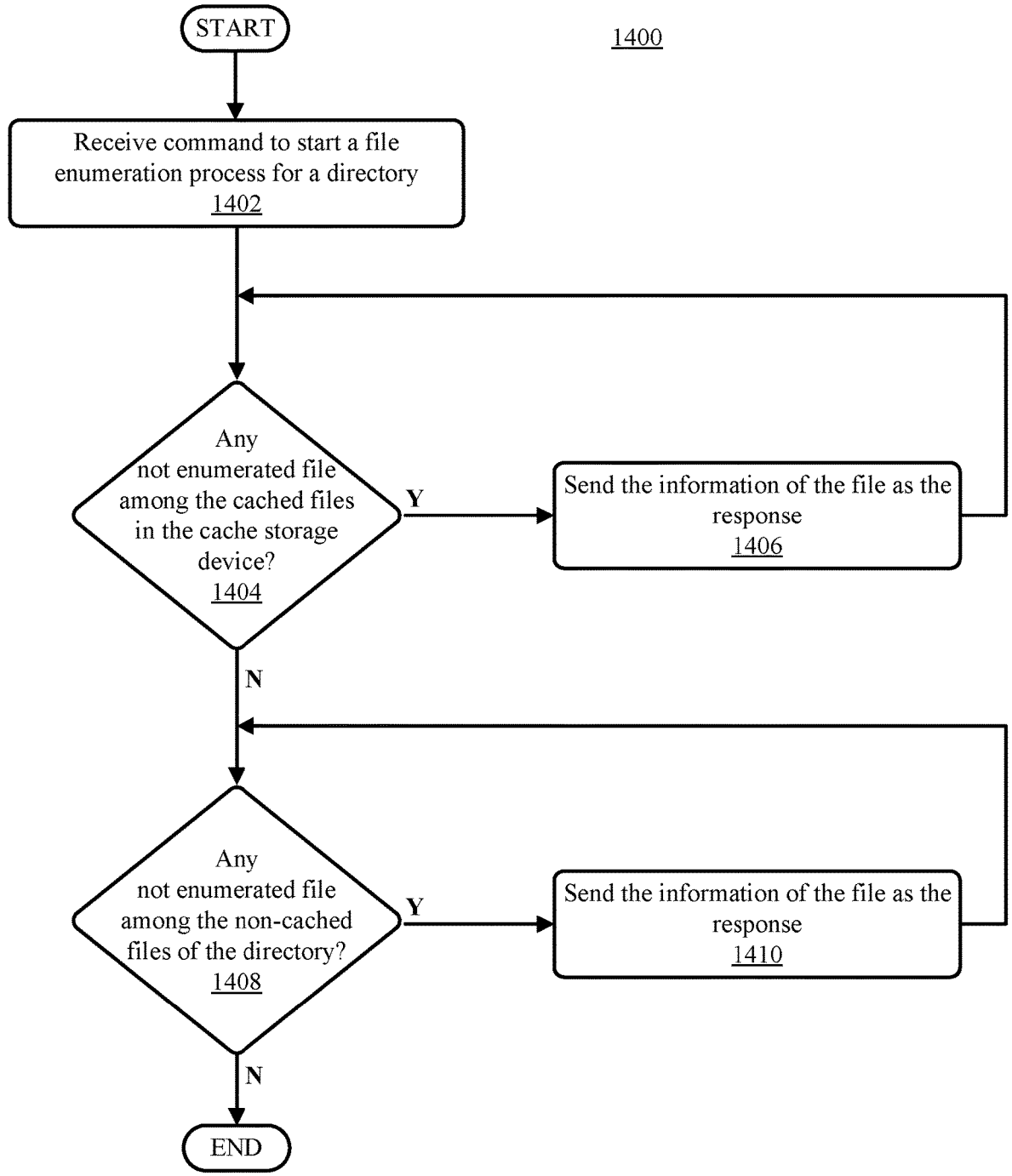
FIG. 14 illustrates a flowchart of an example method for performing a file enumeration process for a directory, in accordance with embodiments of the present disclosure.

Referring now to FIG. 14, illustrated is a flowchart of an example method 1400 for performing a file enumeration process for a directory, in accordance with embodiments of the present disclosure. The method 1400 may be performed by processing logic that comprises hardware (e.g., circuitry, dedicated logic, programmable logic, microcode, etc.), software (e.g., instructions run on a processor to perform hardware simulation), firmware, and/or a combination thereof. In some embodiments, the method 1400 is a computer-implemented method performed by a processor or controller (e.g., a storage controller). The method 1400 may begin at operation 1402, wherein a processor may receive a command to start a file enumeration process for a directory.

After receiving the command at operation 1402, the processor may determine whether any files of the directory that are still not enumerated are cached in the cache storage device at decision block 1404. In other words, the processor may first determine which file have not yet been enumerated (e.g., a set of un-enumerated files), and then determine which of the un-enumerated files are found in the cache storage system. For each un-enumerated file that has been cached, the processor may return (e.g., transmit) the information of the file as the response to the enumeration command at operation 1406. Operations 1404 and 1406 may be repeated until there are no longer any un-enumerated files of the directory stored in cache.

After enumerating all of the files of the directory that are cached, the method 1400 may continue to decision block 1408. At decision block 1408, the processor determines whether there are any un-enumerated files that were not cached (i.e., are only found on the tape medium). For each such file, the processor sends information about the file as a response to the command at operation 1410. Operations 1404 and 1406 may be repeated until the directory has been completely enumerated (i.e., all files have been enumerated).

In some embodiments, upon receiving the command at operation 1402, the processor may also begin mounting and preparing the tape medium for data retrieval. This may occur in parallel with operations 1404 and 1406 such that the files are being retrieved while the tape medium is becoming operational, thereby saving time by (1) retrieving file information before the tape medium is ready and (2) using the faster cache storage to retrieve any file that has been cached.

Figure 15:
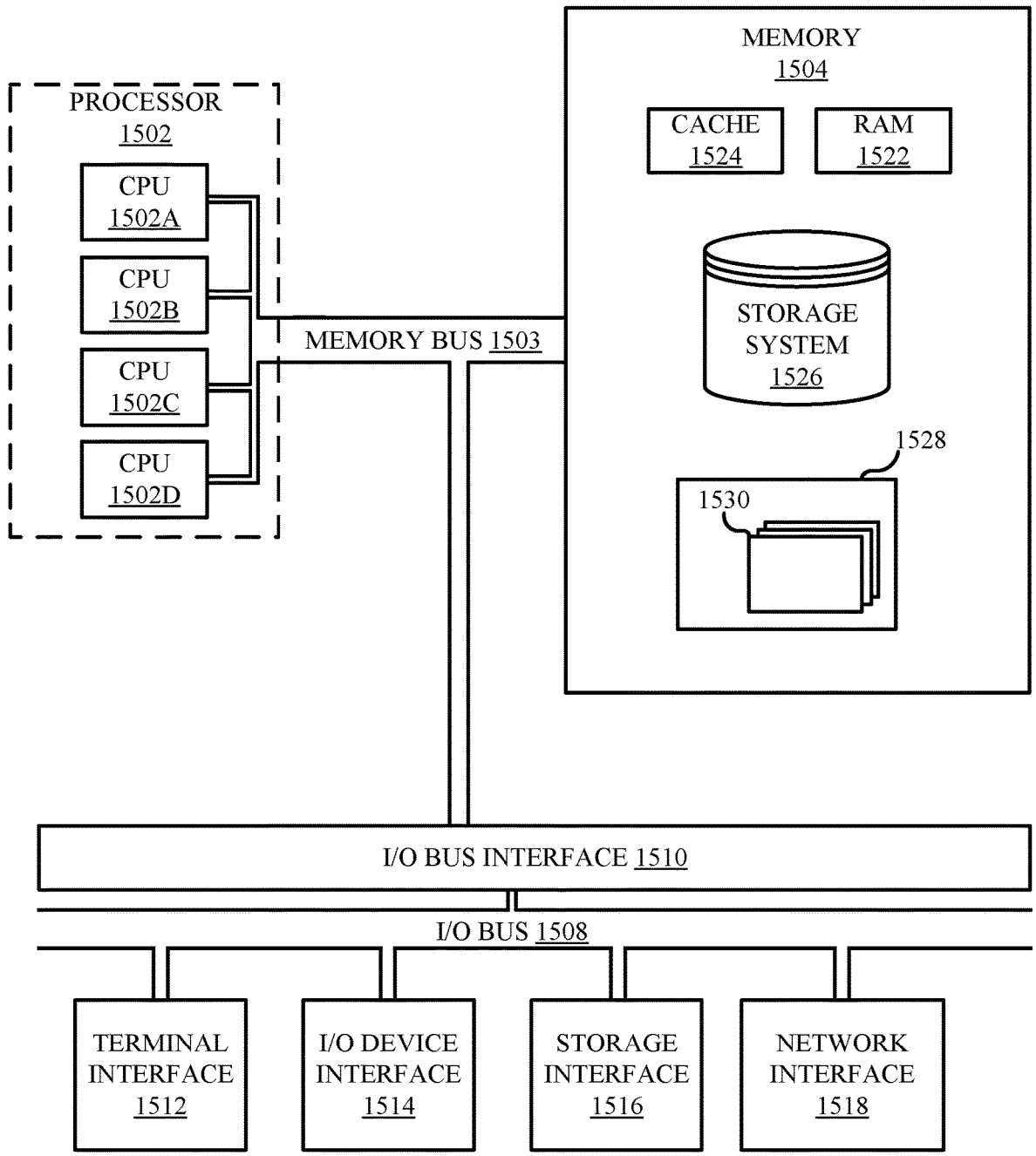
FIG. 15 illustrates a high-level block diagram of an example computer system that may be used in implementing one or more of the methods, tools, and modules, and any related functions, described herein, in accordance with embodiments of the present disclosure.

Referring now to FIG. 15, shown is a high-level block diagram of an example computer system 1501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1501 may comprise one or more CPUs 1502, a memory subsystem 1504, a terminal interface 1512, a storage interface 1516, an I/O (Input/Output) device interface 1514, and a network interface 1518, all of which may be communicatively coupled, directly or indirectly, for inter-component communication via a memory bus 1503, an I/O bus 1508, and an I/O bus interface unit 1510.

The computer system 1501 may contain one or more general-purpose programmable central processing units (CPUs) 1502A, 1502B, 1502C, and 1502D, herein generically referred to as the CPU 1502. In some embodiments, the computer system 1501 may contain multiple processors typical of a relatively large system; however, in other embodiments the computer system 1501 may alternatively be a single CPU system. Each CPU 1502 may execute instructions stored in the memory subsystem 1504 and may include one or more levels of on-board cache.

System memory 1504 may include computer system readable media in the form of volatile memory, such as random access memory (RAM) 1522 or cache memory 1524. Computer system 1501 may further include other removable/non-removable, volatile/non-volatile computer system storage media. By way of example only, storage system 1526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 1504 can include flash memory, e.g., a flash memory stick drive or a flash drive. Memory devices can be connected to memory bus 1503 by one or more data media interfaces. The memory 1504 may include at least one program product having a set (e.g., at least one) of program modules that are configured to carry out the functions of various embodiments.

One or more programs/utilities 1528, each having at least one set of program modules 1530 may be stored in memory 1504. The programs/utilities 1528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 1530 generally perform the functions or methodologies of various embodiments.

Although the memory bus 1503 is shown in FIG. 15 as a single bus structure providing a direct communication path among the CPUs 1502, the memory subsystem 1504, and the I/O bus interface 1510, the memory bus 1503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1510 and the I/O bus 1508 are shown as single respective units, the computer system 1501 may, in some embodiments, contain multiple I/O bus interface units 1510, multiple I/O buses 1508, or both. Further, while multiple I/O interface units are shown, which separate the I/O bus 1508 from various communications paths running to the various I/O devices, in other embodiments some or all of the I/O devices may be connected directly to one or more system I/O buses.

In some embodiments, the computer system 1501 may be a multi-user mainframe computer system, a single-user system, or a server computer or similar device that has little or no direct user interface, but receives requests from other computer systems (clients). Further, in some embodiments, the computer system 1501 may be implemented as a desktop computer, portable computer, laptop or notebook computer, tablet computer, pocket computer, telephone, smart phone, network switches or routers, or any other appropriate type of electronic device.

It is noted that FIG. 15 is intended to depict the representative major components of an exemplary computer system 1501. In some embodiments, however, individual components may have greater or lesser complexity than as represented in FIG. 15, components other than or in addition to those shown in FIG. 15 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A method for enumerating files on a tape medium and a cache storage device, the method comprising:
   receiving a command to enumerate a directory having a plurality of files stored on a tape medium;
   determining that the directory has been at least partially cached to a cache storage device;
   for each file of the directory that is stored in the cache storage device:
      determining whether the file has been enumerated; and
      responsive to determining that the file has not been enumerated, returning information of the file as a response to the command;
   mounting the tape medium in parallel to retrieving data from the cache storage device;
   determining that all files stored in the cache storage device have been enumerated;
   determining whether any files of the directory that are stored in the tape medium have not yet been enumerated; and
   for each file that is stored in the tape medium that has not been enumerated, returning information of the file as a response to the command.

2. The method of claim 1, wherein determining that the directory has been at least partially cached to the cache storage device includes:
   determining an identifier for the tape medium;
   retrieving, from a memory unit, index information for the tape medium using the identifier; and
   determining, using the index information, that the directory has been cached.

3. The method of claim 2, wherein the index information includes one or more selected from the group consisting of a directory name for each cached directory, a directory name for each cached file, and an identifier of a cache storage device where each cached directory or file is stored.

4. The method of claim 2, wherein the index information further comprises a location of the directory in the cache storage and a location of the directory on the tape medium.

5. The method of claim 4, wherein mounting the tape medium in parallel to retrieving data from the cache storage device comprises moving a tape head of a tape drive to which the tape medium is being mounted to the location of the directory on the tape medium.

6. The method of claim 5, wherein the tape head is moved to a location of a first un-cached file of the directory.

7. The method of claim 1, wherein the cache storage device is selected from a group consisting of a hard disk drive (HDD) and a solid-state drive (SSD).

8. A system comprising:
a memory; and
a processor communicatively coupled to the memory, wherein the processor is configured to perform a method comprising:
receiving a command to copy a directory having a plurality of data files stored on a tape medium to a storage device;
determining that one or more data files of the directory have been cached to a cache storage device;
for each file of the directory that is stored in the cache storage device:
determining whether the file has been enumerated; and
responsive to determining that the file has not been enumerated, returning information of the file as a response to the command;
mounting the tape medium in parallel to retrieving data from the cache storage device;
determining that all files stored in the cache storage device have been enumerated;
determining, in response to all files of the directory that are stored in the cache storage device being enumerated, whether any files of the directory that are stored in the tape medium have not yet been enumerated; and
for each file that is stored in the tape medium that has not been enumerated, returning information of the file as a response to the command.

9. The system of claim 8, wherein determining that one or more files of the directory have been cached to the cache storage device includes:
determining an identifier for the tape medium;
retrieving, from a memory unit, index information for the tape medium using the identifier; and
determining, using the index information, that the directory has been cached.

10. The system of claim 9, wherein the index information includes one or more selected from the group consisting of a directory name for each cached directory, a directory name for each cached file, and an identifier of a cache storage device where each cached directory or file is stored.

11. The system of claim 9, wherein the index information further comprises a location of the directory in the cache storage and a location of the directory on the tape medium.

12. The system of claim 11, wherein mounting the tape medium in parallel to retrieving data from the cache storage device comprises moving a tape head of a tape drive to which the tape medium is being mounted to the location of the directory on the tape medium.

13. The system of claim 12, wherein the tape head is moved to a location of a first un-cached file of the directory.

14. A computer program product comprising a computer readable storage medium having program instructions embodied therewith, the program instructions executable by processor to cause the processor to perform a method comprising:
receiving a command to enumerate a directory having a plurality of files stored on a tape medium;
determining that the directory has been at least partially cached to a cache storage device;
for each file of the directory that is stored in the cache storage device:
determining whether the file has been enumerated; and
responsive to determining that the file has not been enumerated, returning information of the file as a response to the command;
mounting the tape medium in parallel to retrieving data from the cache storage device;
determining that all files stored in the cache storage device have been enumerated;
determining whether any files of the directory that are stored in the tape medium have not yet been enumerated; and
for each file that is stored in the tape medium that has not been enumerated, returning information of the file as a response to the command.

15. The computer program product of claim 14, wherein determining that the directory has been at least partially cached to the cache storage device includes:
determining an identifier for the tape medium;
retrieving, from a memory unit, index information for the tape medium using the identifier; and
determining, using the index information, that the directory has been cached.

16. The computer program product of claim 15, wherein the index information includes one or more selected from the group consisting of a directory name for each cached directory, a directory name for each cached file, and an identifier of a cache storage device where each cached directory or file is stored.

17. The computer program product of claim 15, wherein the index information further comprises a location of the directory in the cache storage and a location of the directory on the tape medium.

* * * * *